March 22, 1932.   S. R. ZIMMERMAN   1,850,950
VEHICLE LIFT
Filed March 19, 1929
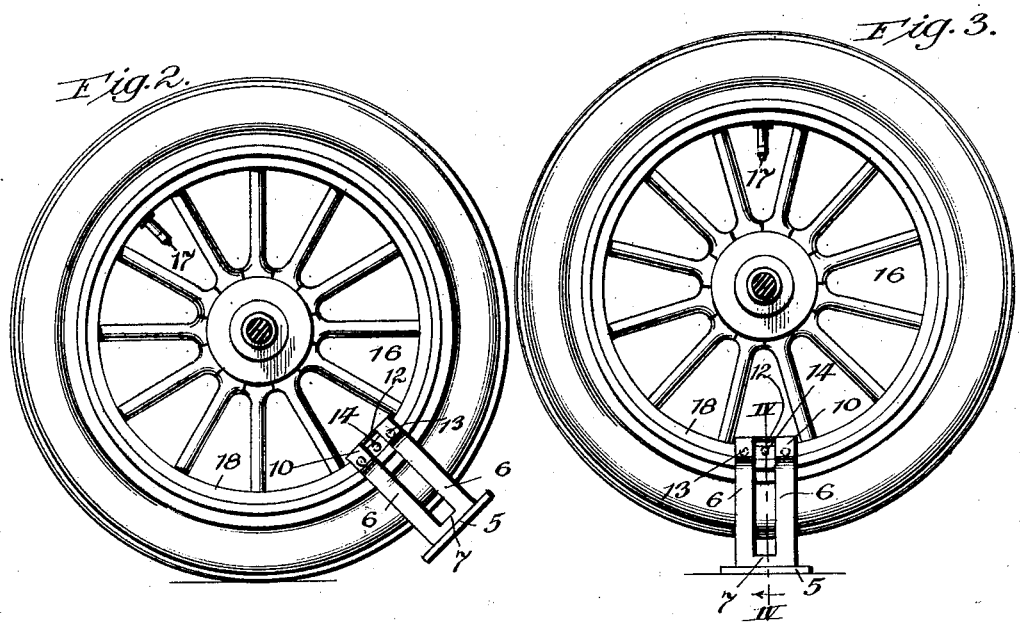
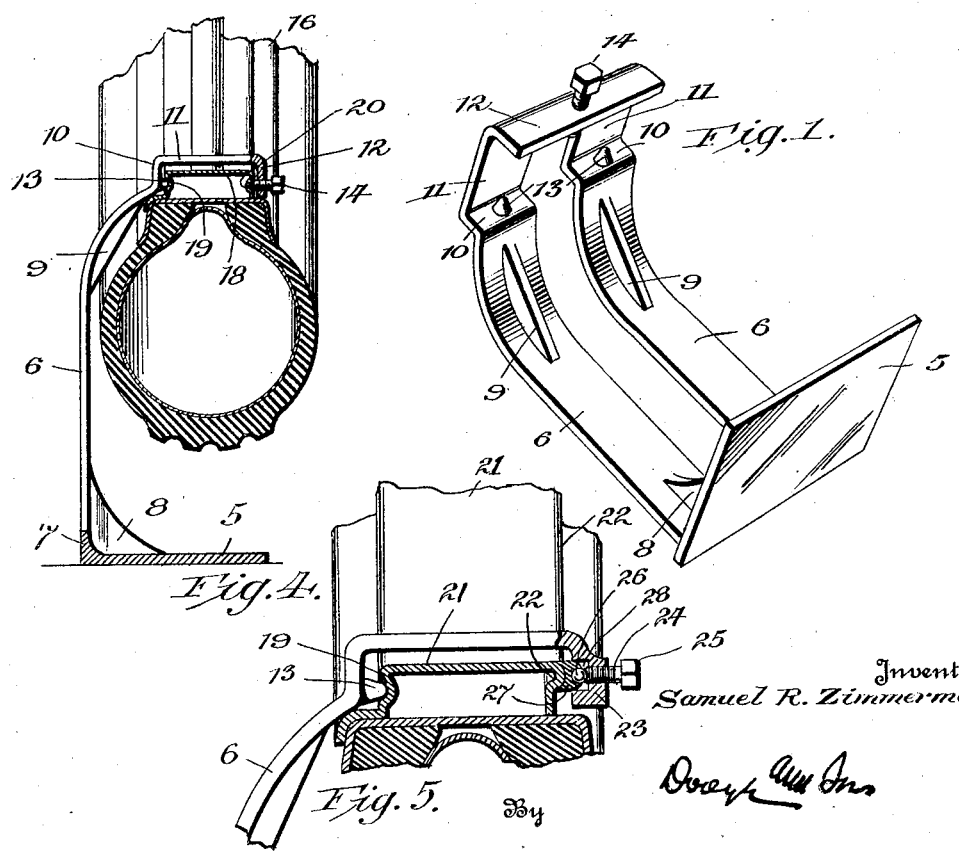
Inventor
Samuel R. Zimmerman
By
Attorneys.

Patented Mar. 22, 1932

1,850,950

UNITED STATES PATENT OFFICE

SAMUEL R. ZIMMERMAN, OF GREENVILLE, SOUTH CAROLINA, ASSIGNOR TO AUTO WHEEL LIFT CORPORATION, OF GREENVILLE, SOUTH CAROLINA, A CORPORATION OF SOUTH CAROLINA

VEHICLE LIFT

Application filed March 19, 1929. Serial No. 348,282.

My invention relates to vehicle lifts and particularly to lifts for raising a vehicle wheel from the ground by the power of the vehicle itself.

One object of my invention is the provision of a lift which may be supplied as standard equipment for vehicles, particularly automobiles, at very slight cost.

Another object is the provision of a lift which may be applied to a vehicle wheel without materially changing the appearance of the wheel or weakening it.

A further object is the provision of a lift which is simple in construction and can be applied to and removed from the wheel without special tools.

Other objects of the invention will appear from the following specification when read in conjunction with the accompanying drawings in which Fig. 1 is a perspective view of one form of lift embodying my invention;

Fig. 2 is a view showing the lift applied to a vehicle wheel prior to the lifting operation;

Fig. 3 is a view showing the lift in position after the wheel has been raised from the ground;

Fig. 4 is a vertical view taken on line IV—IV of Fig. 3; and

Fig. 5 is a broken sectional view of a modified form of lift.

The lift, as shown in Fig. 1, comprises a substantially flat base 5 having two upstanding legs 6 connected thereto and also connected to each other by means of a narrow web 7. The legs 6 are spaced apart and are bent over the base 5 so as to form a space for the accommodation of the rim and tire of a vehicle wheel. These legs are further bent to form a channel-shaped portion adapted to embrace the felly of the wheel. This fellyembracing portion is made up of two vertical flanges 10, bent upwardly from the legs 6, two horizontal portions 11 connected to the vertical flanges, and a single outer vertical flange 12 which not only forms the outer side of the channel-shaped felly-embracing portion, but connects together the two legs 6 to form a rigid construction. Suitable reinforcing webs 8 serve to strengthen the connection between base 5 and legs 6, and similar webs 9 reinforce the upper bent over portions of these legs.

Each of the vertical flanges 10 carries a projection 13 which is adapted to cooperate with an indentation 19 in the inner face of felly 18. These projections are preferably of conical shape and are formed in any suitable manner which provides a strong and rigid construction. If the lift as a whole is formed by casting, then these projections may conveniently be formed as integral parts of the flanges 10. If the legs 6 together with flanges 10 are formed of heavy sheet steel these projections may take the form of rivets which are secured in place in openings drilled through the flanges 10, or they may be punched out from the metal of legs 6. Spaced mid-way between the projections 13, and cooperating therewith is a locking screw 14 which is threaded through the flange 12 of the felly-embracing portion. This locking screw is adapted to enter an indentation 20 in the outside face of the felly of the wheel, so that when projections 13 enter the indentations 19 this screw may be tightened to secure the lift firmly to the wheel by giving the screw a few turns. It is preferable to make the indentations 19 and 20 at a point in the felly opposite to the valve 17 in order that the valve may be in a conveniently accessible position when the wheel is jacked up.

The manner of using the lift will be apparent from inspection of Figs. 2 and 3. When it is desired to life the wheel 16 for any purpose, the vehicle is driven to a position in which the indentations in the felly are conveniently accessible. The lift is placed over the felly 18 of the wheel in such position that projections 13 register with and enter the indentations 19 on the inner face of the felly. The locking screw is then positioned to enter the indentation 20 in the outer face of the felly, and is tightened to clamp the lift in place. When the projections 13 and the locking screw 14 register with the indentations with which they cooperate, none of the parts of the lift engage the rim or tire and the legs 16 are inside of and spaced from the tire so as not to interfere with it. After the jack is secured to the felly the vehicle is driven forward so that the wheel 16 rotates in a clockwise direction as seen in Fig. 2. The base 5 strikes the ground causing a gradual lift of the wheel until the base is in flat surface engagement with the ground as shown in Fig. 3, at which time further movement of the vehicle is stopped. The jacking up process is now complete and the tire may be removed or replaced or any other desired adjustments made without interfering with the operation of the lift, or causing it to be displaced. When it is desired to lower the wheel, the vehicle is driven forward or backward and the wheel will be canted on the base 5 and will gradually tilt with the legs 6 at a decreasing angle until the surface of the tire again engages the ground. As soon as the wheel is lowered so that the tire supports the weight of the vehicle and the base 5 is out of contact with the ground, further movement of the vehicle is stopped and the lift may be removed by loosening the locking screw 14 and disengaging the channel-shaped portion of the lift from the felly.

The invention is here shown as applied to an artillery wheel 16 of ordinary construction in which the felly is formed of channel steel. My invention is particularly adapted for use with wheels of this construction although its use is obviously not limited thereto.

In Fig. 5 I have illustrated a modified form of lift adapted for use with wheels in which the outer face of the felly 21 has a circumferential strengthening rib 22 extending entirely around it. In this case the inner face of the felly contains two spaced indentations 19 cooperating with spaced lugs 13 as before, but the outer flange of the channel portion is thickened at 23 to receive a modified form of clamping device.

This clamping device consists of a threaded bolt 24 having an outwardly projecting head 25 and an inwardly projecting ball 26. This ball forms a swivel connection with a felly-engaging member 27 which is suitably shaped to engage and lock around the rib 22. This member is guided by a socket 28 in the outer flange of the felly to insure that when the projections 13 are forced into the indentations 19 and the bolt 24 is tightened, the member 27 will accurately engage rib 22 to lock the lift rigidly in position.

This form of lift is of still further simplicity in that it requires only that the felly be constructed with two indentations on its inner face while the outer face is not altered.

It will be apparent that this is a very simple and efficient construction, and that the lift may be applied to a wheel without the use of any tools other than a lug wrench. Raising the vehicle requires no manual exertion on the part of the operator and the means for applying the lift does not detract from the appearance of the vehicle. The device is also of particular efficiency because it contacts with the felly of the wheel at two comparatively widely spaced points so as to distribute the strain and to provide a powerful leverage which is brought into play when the vehicle is set in motion with one edge of the base of the lift engaging the ground.

Although I have herein shown and described only one form of vehicle lift embodying my invention, it will be obvious that various changes and modifications may be made in the details thereof, within the scope of the appended claims, without departing from the spirit and scope of my invention.

What is claimed is:

1. The combination with a vehicle wheel having cooperating indentations in opposite sides of the felly, of a lift comprising a felly-embracing portion having a plurality of projections for engagement with indentations in one side of the felly, clamping means for engagement with an indentation in the other side of the felly, supporting means connected to said felly-embracing portion, and a flat base connected to said means to support said wheel.

2. The combination with a vehicle wheel having cooperating indentations in opposite sides of the felly, of a lift comprising a felly-embracing portion having a plurality of spaced projections adapted to engage the indentations in the inner face of the felly and a clamping device adapted to engage an indentation in the outer face of the felly, a pair of spaced supporting legs secured to said felly-embracing portion, and a supporting base secured to said legs at the ends remote from said felly-embracing portion.

3. The combination with a vehicle wheel having cooperating indentations in opposite sides of the felly, of a lift comprising a channel-shaped felly-embracing portion, a pair of spaced projections on the inside of said channel-shaped portion and cooperating with the indentations on the inner face of the felly, an adjustable locking device in the opposite side of said channel-shaped portion mid-way between the projections and cooperating with an indentation in the outer face of the felly to secure the lift thereto, and a supporting base and legs connected to said channel-shaped portion, said base being spaced from said channel-shaped portion.

4. A vehicle lift comprising a flat base, supporting means secured to said base, said means being shaped at the upper end to form a wheel-engaging channel portion, a plurality of felly-engaging means on the inner face of said channel portion, and an adjustable clamping device on the outer face of said channel portion and cooperating with said felly-engaging means to clamp said lift to the felly of a wheel, whereby said lift is secured to the wheel solely by engagement with said felly.

5. The combination with a vehicle wheel having a felly with faces of uneven contour, of a lift comprising a base, supporting means extending upward from said base to form a channel portion, means on the inner face of said channel portion for forming at least a two-point inter-engagement with one face of the felly, and an adjustable clamping device on the outer face of said channel portion constructed and arranged for inter-engagement with the other face of the felly to lock said lift to said felly.

In testimony whereof I have signed my name to this specification.

SAMUEL R. ZIMMERMAN.